United States Patent [19]
Hoshino

[11] Patent Number: 4,796,508
[45] Date of Patent: Jan. 10, 1989

[54] MUSICAL INSTRUMENT SUPPORT FIXTURE

[75] Inventor: Yoshihiro Hoshino, Nagoya, Japan

[73] Assignee: Hoshino Gakki Co., Ltd., Japan

[21] Appl. No.: 14,603

[22] Filed: Feb. 13, 1987

[30] Foreign Application Priority Data

Jul. 31, 1986 [JP] Japan .................. 61-118581

[51] Int. Cl.[4] .............................................. G10G 5/00
[52] U.S. Cl. .................................... 84/421; 248/288.5
[58] Field of Search .............. 84/421; 248/288.3, 288.5

[56] References Cited

U.S. PATENT DOCUMENTS

| | | | |
|---|---|---|---|
| 3,405,587 | 10/1968 | Meazzi et al. | 84/421 |
| 3,576,149 | 4/1971 | Slingerland | 84/421 |
| 3,945,291 | 3/1976 | Zickos | 84/421 |
| 4,037,229 | 7/1977 | Dunk | 343/715 |
| 4,158,981 | 6/1979 | Kurosaki | 84/421 |
| 4,453,446 | 6/1984 | Hoshino | 84/421 |
| 4,640,175 | 2/1987 | Hoshino | 84/421 |
| 4,747,569 | 5/1988 | Hoshino | 248/286 |

Primary Examiner—Lawrence R. Franklin
Attorney, Agent, or Firm—Ostrolenk, Faber, Gerb & Soffen

[57] ABSTRACT

A fixture for supporting a musical instrument drum, or the like, includes a stem which supports a ball and the ball is clampable between two clamping parts forming a socket for clamping the ball. A pivotable cam draws the two socket parts together or releases them from clamping and unclamping the ball, and the clamp can be oriented at any orientation around the ball. A holding rod for the drum is clamped in a socket between the second of the clamping parts and a third clamping part which is bolted to the second clamping part for clamping the two parts together. Compression springs urge the first and second clamping parts apart and the second and third clamping parts apart respectively against the urging of the cam and of the bolts for tightening the clamping parts together.

17 Claims, 3 Drawing Sheets

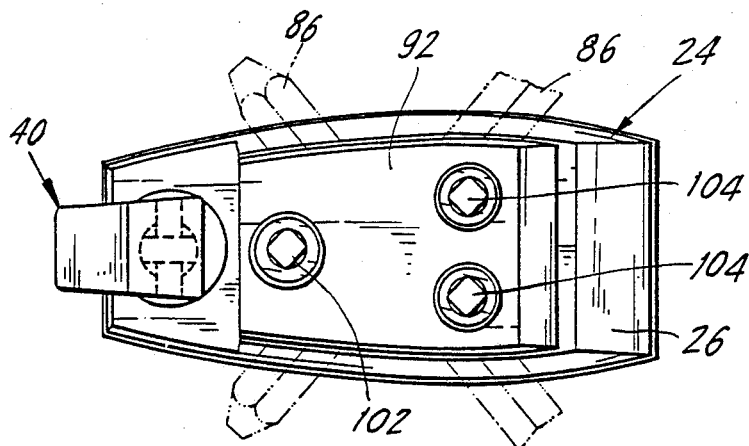
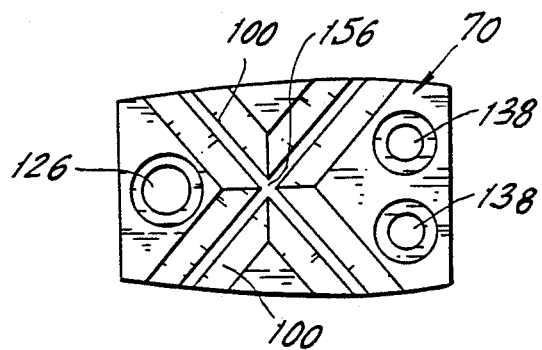
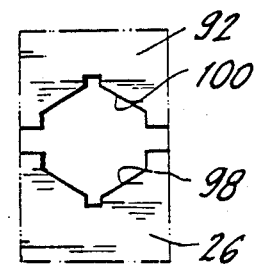
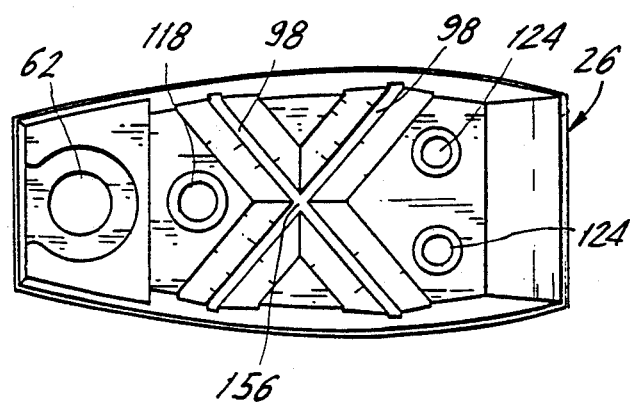

ND: 4,796,508

MUSICAL INSTRUMENT SUPPORT FIXTURE

BACKGROUND OF THE INVENTION

1. Field of the Invention

This invention relates to support fixtures for musical instruments. More particularly, this invention relates to an improved support fixture incorporating a ball and socket mechanism.

2. Description of the Prior Art

Various arrangements are known for supporting small percussion instruments such that their playing surfaces can be easily reached by the performer. In particular, bracket arrangements for tom-toms, having several degrees of freedom, are useful particularly in multiple drum sets. One such arrangement is shown in Japanese Utility Model No. 59-1094. Other examples are illustrated in U.S. Pat. Nos. 3,535,976 and 4,453,446. Such arrangements may include a ball clamped into a socket, with a rod attached to and projecting from the ball to support a drum. Such devices offer both vertical and rotational freedom of movement. However, horizontal or lateral freedom of movement is somewhat limited.

OBJECTS OF THE INVENTION

It is an object of the invention to provide a musical instrument support fixture which allows several degrees of freedom.

It is a further object of the invention to provide a musical instrument support fixture which offers ease of adjustment.

It is a further object of the invention to provide a musical instrument support fixture which will hold the instruments firmly in place.

SUMMARY OF THE INVENTION

These objects as well as others not enumerated here are achieved by a fixture according to the invention. One embodiment includes a stem, normally attached to a fixed stand, having a clampable part in the form of a ball received by a releasably closable clamp. An L-shaped rod is also releasably clamped to the clamp. The ball and socket permit rotational movement about the ball while the L-shaped rod offers vertical and horizontal adjustments of the drum along the directions of the segments of the rod. In an alternative embodiment, the rod clamping mechanism in the socket has two angled channels in which one segment of the L-shaped rod can be selectively held, for changing the position of the upright segment of the L-shaped rod. Further, the L-shaped rod has a hexagonal cross-section, offering the ability to rotate the rod about its horizontal segment.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings, wherein:

FIG. 3 is a top view of the clamp structure;

FIG. 4 is a top view of the lower section L-shaped rod clamp;

FIG. 5 is a bottom view of the upper portion of the L-shaped rod clamp; and

FIG. 6 is a cross-section of the L-shaped rod channel through the upper and lower portions of the clamp.

DETAILED DESCRIPTION OF THE INVENTION

Figure 1:
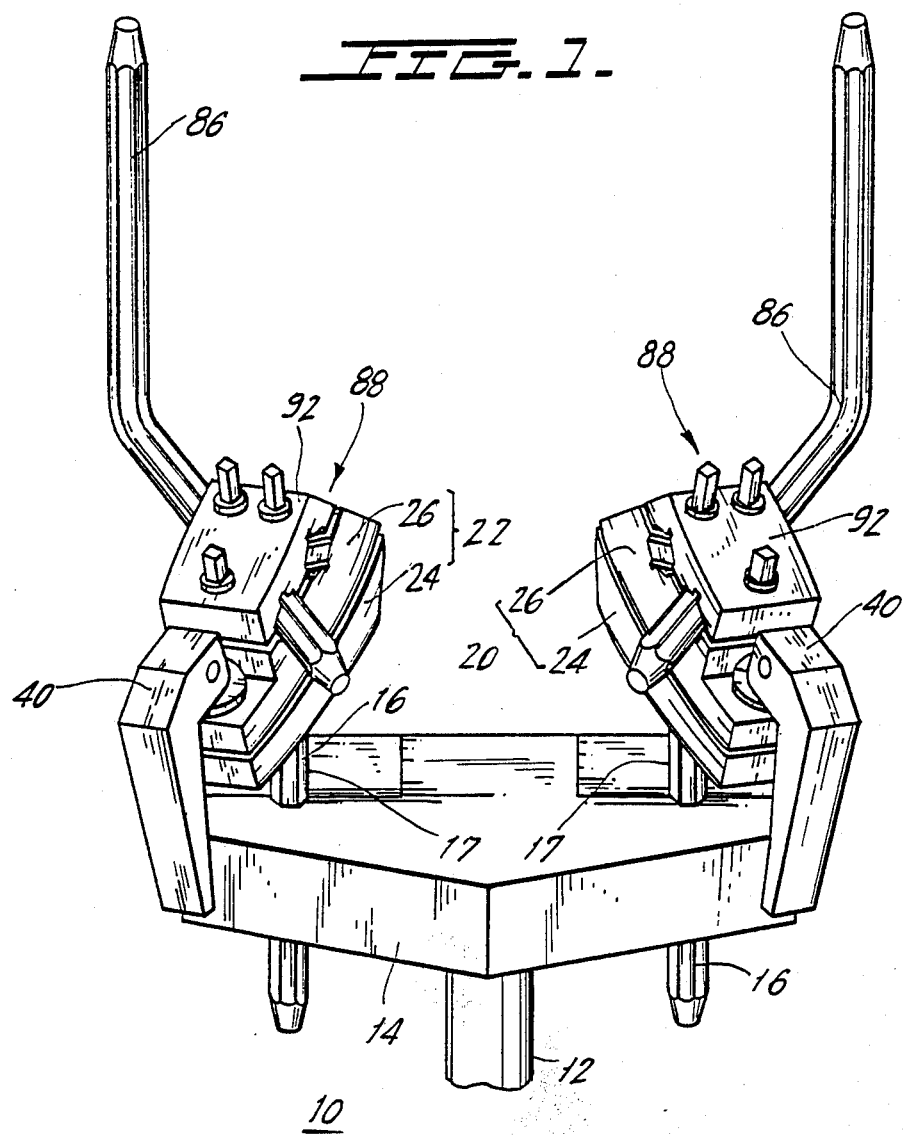
FIG. 1 is a plan view of the musical instrument support structure according to the invention.
Figure 2:
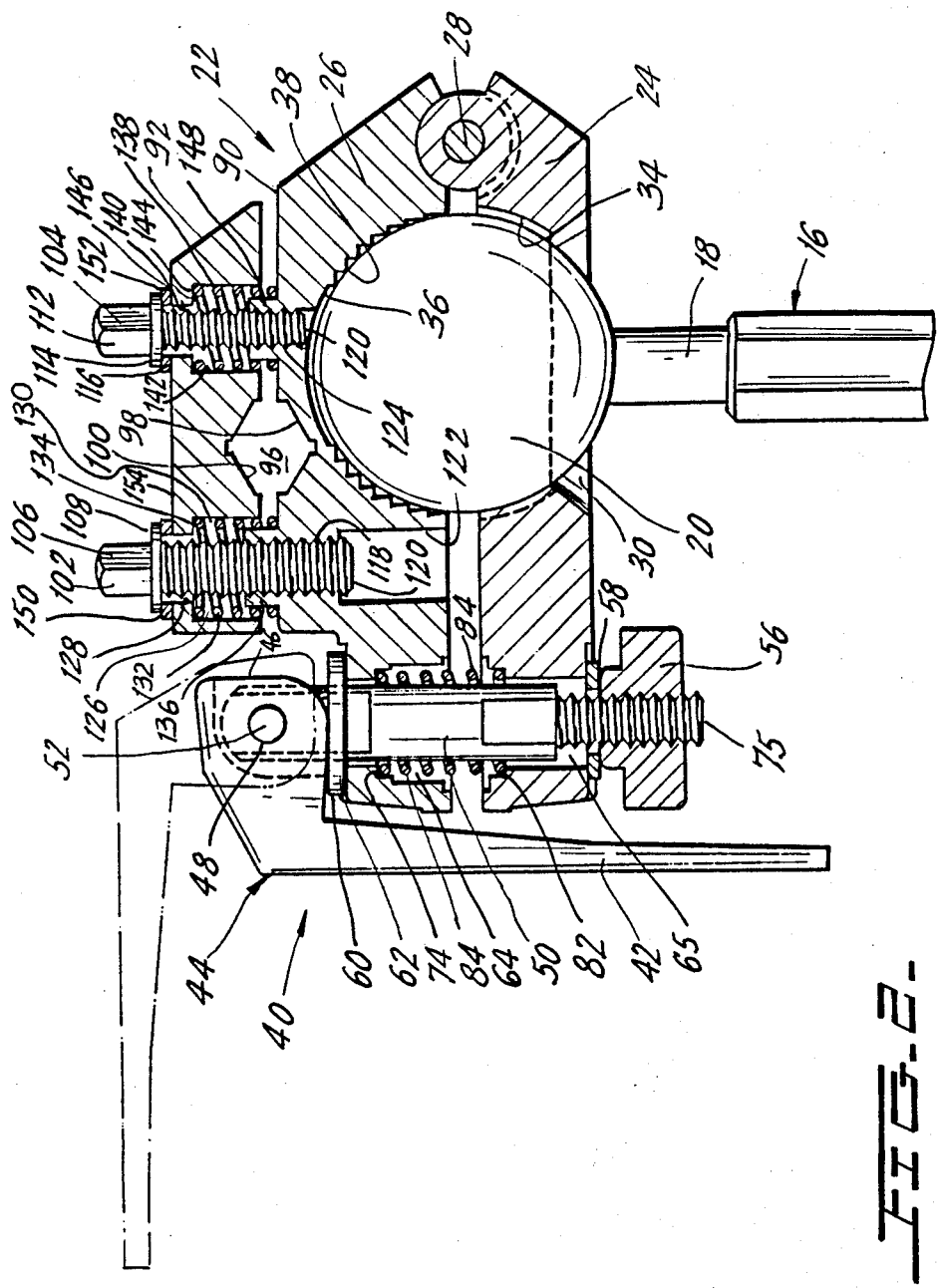
FIG. 2 is a partial cross-sectional view of the musical instrument support structure.

FIG. 1 shows the musical instrument support fixture 10. The fixture 10 has a support stem 12 which supports a five-sided horizontal platform 14. The platform 14 clampably receives ball stems 16 which can be clamped at any selected height with respect to platform 14. As illustrated in FIG. 2, the ball stems 16 have a hexagonal cross-section exteriors but may have a round, square shaped, or other suitable cross-section. They are inserted in matingly shaped bores 17 in the platform 14.

Each stem supports a shaft 18 which terminates in a ball 20. The ball 20 may be of any suitable material including a synthetic resin. The ball 20 is releasably clamped within a socket assembly 22. The major components of the socket assembly 22 are the lower socket portion 24 and the upper socket portion 26. The two portions 24 and 26 are held together by a hinge or axis pin 28.

The lower socket portion 24 has an angled wall, wide diameter counter bore 30, which offers increased freedom of angular movement of the shaft 18 and the ball 20 with respect to the socket assembly 22. The ball 20 rests against the lower socket portion 24 at concave surface 34.

The ball 20 rests against the upper socket portion 26 at concave surface 36 which has convex ridges 38 that dig into the ball when the ball is clamped in the assembly 22. The upper 26 and lower 24 socket portions are pivotally connected by the axial pin 28 at one end and are releasably held together by a spring clamp assembly 40 at the other end.

The spring clamp assembly 40 comprises an integral lever and cam 42 having a generally straight lever portion 44 integrally affixed at right angles to a cam portion 46 which has a central through bore 48.

The cam and lever 42, 44 is pivotally attached to a connecting rod 50 by a pin 52 passing through the central through bore 48 and through a bore (not shown) in the connecting 50. The connecting rod 50 has a threaded portion 75 on the end opposite the connection to the lever and cam assembly 40. The threaded end 75 is secured at lower socket portion 24 by a nut 56 and washer 58. The cam portion 46 rides on a washer 60 which encircles the upper end of the rod 50 and also sits on top of a shelf 62 on the upper socket portion 26.

The connecting rod 50 passes through a bore 64 in the upper socket portion 26 and a bore 65 in the lower socket portion 24. The bore 64 has a first spring seat 74. The bore 65 in the lower socket portion 24 has a second spring seat 82. A compression spring 84, surrounding the connecting rod 50, presses against the seats 74 and 82. The spring 84 urges the upper and lower socket portions 26 and 24 apart, keeping tension on the cam portion 46 of the lever and cam 42, 44 so that rotation of the cam 46 will shift their socket portions to clamp and unclamp the ball 20.

The support fixture 10 includes L-shaped rods 86 (FIG. 1) which are held in respective clamp assemblies 88. In FIG. 2, the clamp assembly 88 comprises the upper surface 90 of the upper socket portion 26 and an upper clamp bracket 92. The L-shaped rod 86 is received between the upper surface 90 and the lower surface 94 of the upper clamp bracket 92 in a channel 96 which is contoured to the cross-section of the L-shaped rod 86. Accordingly, the groove 98 in the upper surface 90 is a mirror image of the groove 100 on the lower surface 94 (FIGS. 2 and 6).

The upper clamp bracket 92 is held down against the upper socket portion 26 by bolts 102 and 104. As illustrated in FIG. 3, the clamp assembly 88 may be provided with two bolts 104 for increased stability. Bolt 102 has a head 106 that is integral with a flat collar 108 which in turn is connected to an integral threaded portion 110. Similarly, bolt 104 has a head 112 connected to a flat collar 114 which in turn is connected to an integral threaded lower portion 116.

The threaded portion 110 of the bolt 102 mates with a threaded bore 118 extending in from the top of the upper socket portion 26. The end 120 of the bolt 102 extends into a counter bore 122 extending up from below the upper socket portion 26. The threaded portion 116 of the bolt 104 mates with a threaded bore 124 in the upper socket portion 26.

The bolt 102 passes through a bore 126 in the upper clamp bracket 92. The bore 126 has a first diameter section 128 and a larger second diameter section or counter bore 130. The counter bore 130 receives a compression spring 132 which has one end resting on a seat 134 in the upper clamp bracket 92 and the other end surrounding a sleeve 136 on the upper surface 90 of the upper socket portion 26.

The bolt 104 passes through a bore 138 in bracket 92 having a first diameter section 140 and a larger second diameter section or counter bore 142 which meet at the seat 144 for a compression spring 146. The other end of the spring 146 rests on the upper surface 90 of the upper socket portion 26 around a sleeve 148. Both bolts 102 and 104 have bearing washers 150 and 152 between their flat portions 108 and 114, respectively, and the upper surface 154 of the upper clamp bracket 92. The springs 132 and 146 urge the bracket 92 away from socket part 26, which opens channel 96 to enable adjustment of rod 86.

In FIGS. 3, 4, and 5, an X-shaped channel 156 is shown in place of channel 96. This feature permits another degree of freedom in adjustment of the musical instrument support fixture 10. The channel 156 permits different orientations of the L-shaped rod 86.

The initial position of rod 86 and thus of the drum it supports is set before a performance and then the bolts 102, 104 are tightened. Before or at a performance, the final adjustment of the drum is obtained by moving the lever 42, releasing the ball 20 for rotation. When the desired position of the ball is reached, the lever 42 is pushed downward, firmly and quickly clamping the ball 20.

While there has been described what is believed to be the preferred embodiment of the invention, those skilled in the art will recognize that other and further modifications may be made thereto without departing from the spirit of the invention, and it is intended to claim all such embodiments that fall within the scope of the invention.

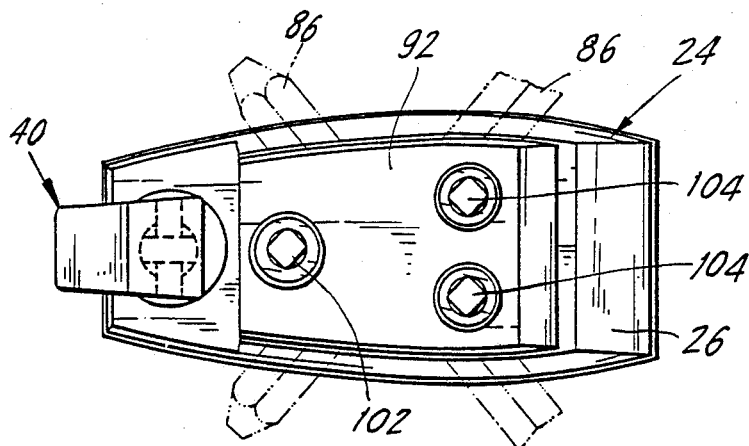
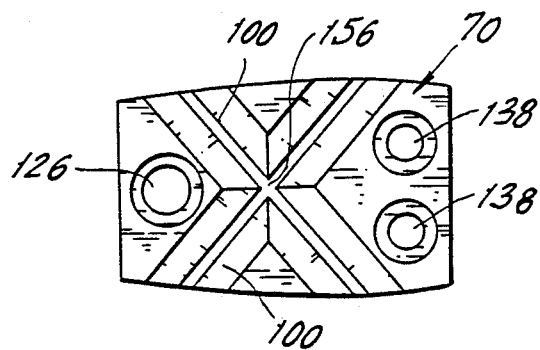
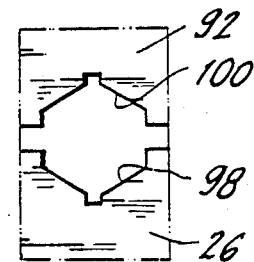
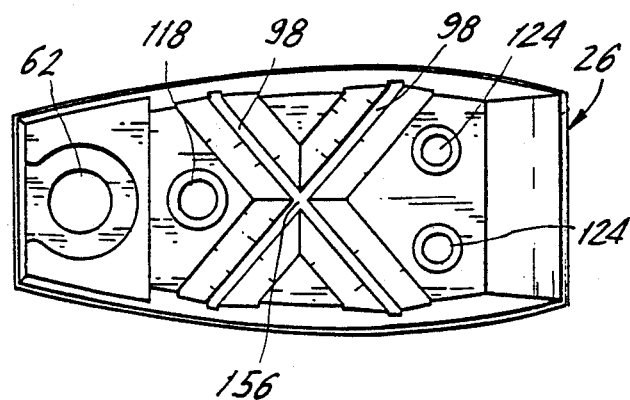

What is claimed:

1. A musical instrument support, comprising:
a stem on which the support is supported, a clampable part on the stem;
a clamp for clamping the clampable part, the clamp having a first clamping part and a cooperating second clamping part which are releasably clampable around the clampable part; the clampable part and the first and second clamping parts being respectively so shaped as to enable the clamp to assume various orientations with respect to the stem upon clamping of the first and second clamping parts upon the clampable part;
an instrument holding rod arranged for being clamped to the second clamping part;
a third clamping part for clamping the holding rod to the second clamping part, and means at the third clamping part for clamping the third clamping part to the second clamping part.

2. The fixture of claim 1, further comprising a hinge connection between the first and second clamping parts, wherein the first and second clamping parts pivot apart to free the clampable part and pivot together to clamp the clampable part.

3. The fixture of claim 2, further comprising a cam in engagement with one of the clamping parts for being moved to move the first and second clamping parts together to clamp the clampable part and for being moved to enable the first and second clamping parts to move apart to unclamp the clampable part.

4. The fixture of claim 3, further comprising means for normally biasing the first and second clamping parts apart and for urging the one clamping part into engagement with the cam, and the cam being movable for countering the biasing force of the biasing means for moving the first and second clamping parts together to clamp the clampable part.

5. The fixture of claim 4, further comprising a shank connecting the cam which is at the one clamping part to the other clamping part, such that movement of the cam against the one clamping part also moves the shank to move the other clamping part selectively to clamp and release the clampable part.

6. The fixture of claim 5, wherein the cam is pivoted to the shank for pivoting between the position moving the first and second clamping parts to clamp the clampable part and the position wherein the first and second clamping parts are enabled to release the clampable part.

7. The fixture of claim 6, further comprising a lever connected with the cam for rotating the cam between the positions thereof.

8. The fixture of claim 1, wherein the first and second clamping parts together define a socket for receiving the clampable part, and the socket being shaped to the shape of the clampable part for enabling the clampable part to be adjusted in its orientation with respect to the stem.

9. The fixture of claim 8, wherein the clampable part is generally a ball.

10. The fixture of claim 1, further comprising an opening in the first clamping part through which the stem from the clampable part protrudes.

11. The fixture of claim 1, further comprising a socket defined between the second and third clamping parts for the holding rod.

12. The fixture of claim 11, wherein the socket between the second and third clamping parts is shaped to the cross-section of the rod, such that the rod is clamped between the second and third clamping parts at a selected rotational orientation of the rod and at a selected position along the length of the rod in the socket there.

13. The fixture of claim 12, further comprising biasing means for normally urging the second and third clamping parts apart off the rod and means for drawing the